(12) United States Patent
Kim

(10) Patent No.: US 7,209,552 B2
(45) Date of Patent: Apr. 24, 2007

(54) TELECOMMUNICATION TERMINAL DEVICE AND METHOD OF USING THE SAME

(75) Inventor: Eog-Kyu Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 21 days.

(21) Appl. No.: 10/685,471

(22) Filed: Oct. 16, 2003

(65) Prior Publication Data
US 2004/0081288 A1    Apr. 29, 2004

(30) Foreign Application Priority Data
Oct. 17, 2002   (KR) ............... 10-2002-0063532

(51) Int. Cl.
*H04M 1/00* (2006.01)
(52) U.S. Cl. ............... 379/93.09; 379/413.02
(58) Field of Classification Search .. 379/93.09–93.11, 379/413.02
See application file for complete search history.

(56) References Cited

U.S. PATENT DOCUMENTS

| | | | |
|---|---|---|---|
| 4,856,049 A * | 8/1989 | Streck ............... | 379/93.09 |
| 5,014,299 A * | 5/1991 | Klupt et al. ............ | 379/93.09 |
| 5,724,554 A * | 3/1998 | Gish ............... | 710/11 |
| 5,912,964 A | 6/1999 | Stelman | |
| 6,005,923 A * | 12/1999 | Lee ............... | 379/93.09 |

\* cited by examiner

*Primary Examiner*—Daniel Swerdlow
(74) *Attorney, Agent, or Firm*—Staas & Halsey LLP

(57) ABSTRACT

A telecommunication terminal device includes a network connection unit having at least a first pin and a second pin to which a public telephone network is connected, and a third pin and a fourth pin through which a first external terminal device of a first type is connected to the first and the second pins; a first switching unit for selectively connecting the public telephone network with the first external terminal device and a second external terminal device of a second type; a first external terminal connection unit having a fifth pin and a sixth pin through which the second external terminal device is connected to the first and the second pins; and a feeding circuit connected to the first and the second pins to keep flow of currents provided from the public telephone network. The telecommunication terminal device is capable of exchanging telecommunication signals regardless of serial or parallel connection to additional external terminal devices.

13 Claims, 9 Drawing Sheets

US 7,209,552 B2

TELECOMMUNICATION TERMINAL DEVICE AND METHOD OF USING THE SAME

CROSS-REFERENCE TO RELATED APPLICATION

This application claims the benefit of Korean Patent Application No. 2002-63532, filed on Oct. 17, 2002 in the Korean Intellectual Property Office, the disclosure of which is incorporated herein in its entirety by reference.

BACKGROUND OF THE INVENTION

1. Field of the Invention

The present invention relates to a telecommunication terminal device used in connection with a public switched telephone network. Particularly, the present invention relates to a telecommunication terminal device and method of using the same, the telecommunication terminal device being capable of transmitting telecommunication signals regardless of a serial connection or parallel connection to an additional telecommunication terminal device.

2. Description of the Related Art

FIG. 1 is a block diagram of a telecommunication terminal device typically used in Korea or the United States. Referring to FIG. 1, a telecommunication terminal device 20 is connected as a main terminal device to a public switched telephone network (PSTN) 10. An external telecommunication terminal device 40 (such as a telephone, a facsimile machine, or the like) is connected as a sub terminal device to the main terminal device 20. The main terminal device 20 includes a PSTN connection unit 22 having two pins 24 and 26 through which the PSTN 10 and a feeding circuit 28 of the main terminal device 20 are connected. The main terminal device 20 also includes an external terminal connection unit 30 having two pins 32 and 34 through which the sub terminal device 40 is connected in parallel to the main terminal device 20.

FIG. 2 is a block diagram of a telecommunication terminal device typically used in Germany or Italy. Referring to FIG. 2, a telecommunication terminal device 70 is connected as a main terminal device to a PSTN 60. An external telecommunication terminal device 90 is connected as a sub terminal device to the main terminal device 70. The main terminal device 70 includes a PSTN connection unit 72 having four pins 74, 76, 78, and 80. The PSTN 60 and a feeding circuit 82 of the main terminal device 70 are connected through two pins 74 and 76 among the four pins of the PSTN connection unit 72. The external terminal device 90 is serially connected to the main terminal device 70 through the other two pins 78 and 80 of the PSTN connection unit 60.

Referring again to FIG. 1, an electrical current provided from the PSTN 10 flows into the feeding circuit 28 and returns to the PSTN 10 through the two pins 24 and 26 of the PSTN connection unit 22. That is, a current loop is formed between the PSTN 10 and the feeding circuit 28 through the two pins 24 and 26 of the PSTN connection unit 22. Likewise, referring to FIG. 2, an electrical current provided from the PSTN 60 flows into the feeding circuit 82 and returns to the PSTN 60 through the two pins 74 and 76 of the PSTN connection unit 72. That is, a current loop is formed between the PSTN 60 and the feeding circuit 82 through the two pins 74 and 76 of the PSTN connection unit 72.

Such a telecommunication terminal device connected to a public switched telephone network is disclosed in U.S. Pat. No. 5,912,964.

However, when a user uses a main terminal device 20, 70 in connection with an external terminal device 40, 90, there is a difference between the telecommunication terminal device shown in FIG. 1 and that shown in FIG. 2. That is, while the external terminal device 40 is connected to the main terminal device 20 through the pins 32 and 34 of the external terminal connection unit 30 in FIG. 1, the external terminal device 90 is connected to the main terminal device 70 through the remaining pins 78 and 80 of the PSTN connection unit 72 in FIG. 2.

As described above, the interface system of the telecommunication terminal device for connecting the external terminal device with the PSTN in the countries using a serial connection system is different that in the countries adopting a parallel connection system. Therefore, it is required to manufacture terminal devices to have different interface systems on a country or regional basis. That is, for the countries such as Korea or the United States, a parallel type terminal device having the interface system shown in FIG. 1 is required. For the countries such as Germany or Italy, a serial type terminal device having the interface system shown in FIG. 2 is required. Consequently, there is a problem in that the terminal device having the interface system shown in FIG. 1 cannot be used in the countries where the interface system shown in FIG. 2 is required.

SUMMARY OF THE INVENTION

The present invention provides a telecommunication terminal device that is capable of transmitting telecommunication signals regardless of a serial connection or a parallel connection to an additional telecommunication terminal device.

The present invention also provides a method of using a telecommunication terminal device that is capable of transmitting telecommunication signals regardless of a serial connection or a parallel connection to an additional telecommunication terminal device.

Additional aspects and/or advantages of the invention will be set forth in part in the description which follows and, in part, will be obvious from the description, or may be learned by practice of the invention.

A telecommunication terminal device according to an aspect of the present invention includes a network connection unit having at least a first pin and a second pin to which a public telephone network is connected, and a third pin and a fourth pin through which one of a first and second external terminal device is connected to the first and the second pins; a first switching unit that selectively connects the first external terminal device and the second external terminal device among the external terminal devices to the public telephone network according to the determined type of external terminal device; a first external terminal connection unit having at least a fifth pin and a sixth pin through which the second external terminal device is connected to the first and the second pins; and a feeding circuit connected to the first and the second pins to keep flow of currents provided from the public telephone network.

A method of using a telecommunication terminal device according to an aspect of the present invention includes determining whether a first external terminal device is selected; if the first external terminal device is selected, allowing telecommunications between a public switched telephone network and the first external terminal device; if the first external terminal device is not selected, determining whether a second external terminal device is selected; and if the second external terminal device is selected and the first external terminal device is not selected, allowing telecommunications between the public switched telephone network and the second external terminal device.

BRIEF DESCRIPTION OF THE DRAWINGS

The above and/or other aspects and advantages of the present invention will become more apparent and more readily appreciated by describing embodiments thereof with reference to the accompanying drawings in which.

DETAILED DESCRIPTION OF THE EMBODIMENTS

Figure 1:
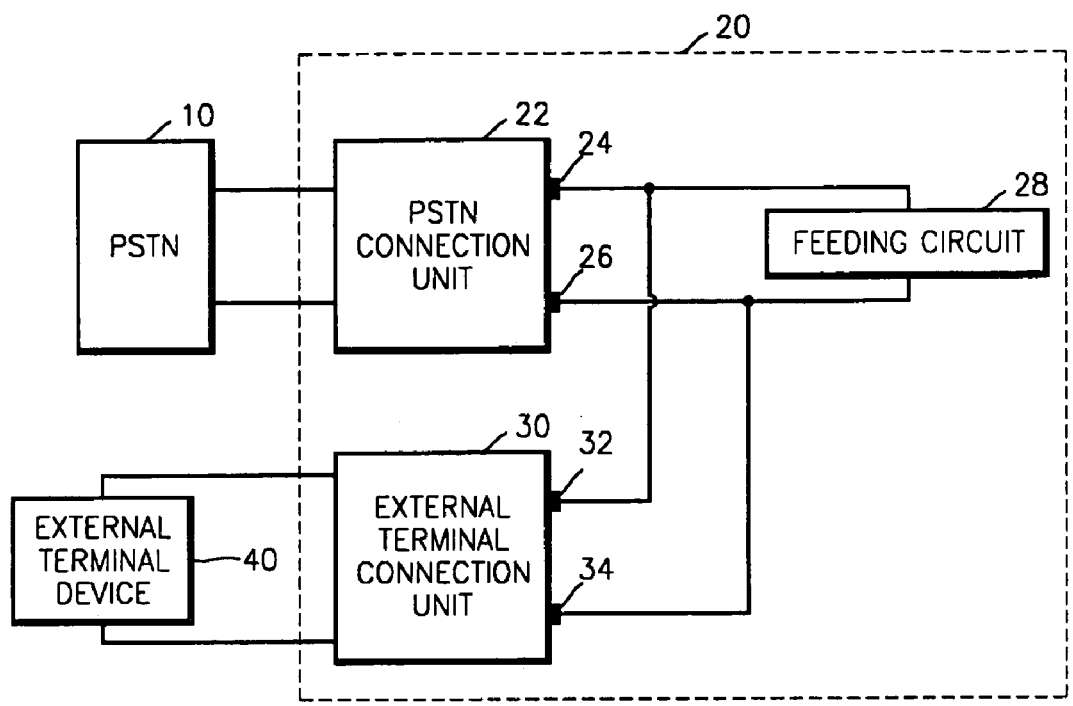
FIG. 1 is a block diagram of a parallel type telecommunication terminal device typically used in used in Korea or the United States that is connected to a public telephone network together with an external terminal device.

Reference will now be made in detail to the present embodiments of the present invention, examples of which are illustrated in the accompanying drawings, wherein like reference numerals refer to the like elements throughout. The embodiments are described below in order to explain the present invention by referring to FIGS. 3 through 9.

Figure 3:
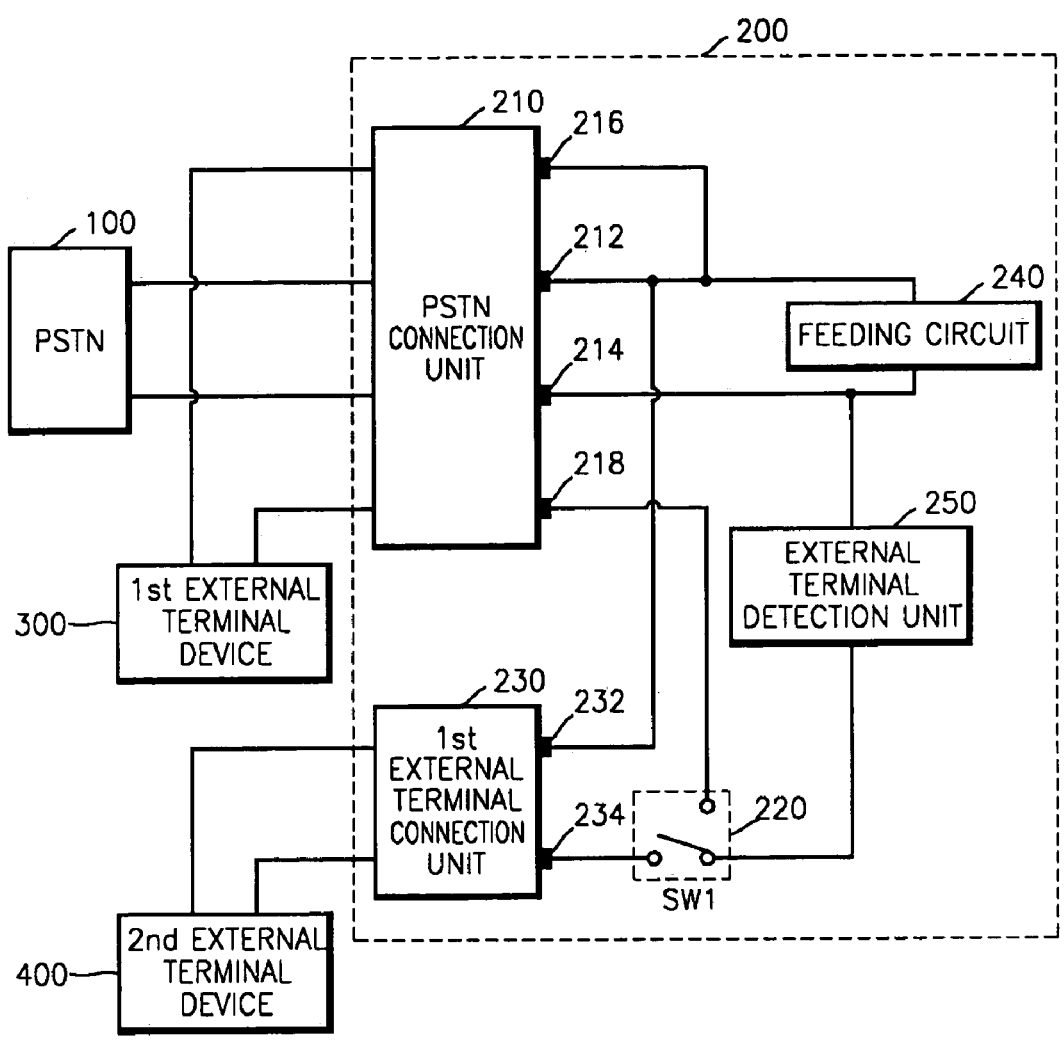
FIG. 3 is a block diagram of a telecommunication terminal device according to an embodiment of the present invention that is connected to a public telephone network together with a first external terminal device.

Referring to FIG. 3, a telecommunication terminal device 200 according to an embodiment of the present invention (hereinafter referred to as a "main terminal device") is shown together with a public switched telephone network (PSTN) 100, a first external terminal device 300, and a second external terminal device 400. The PSTN 100 is a typical public switched telephone network operated by a public telecommunication service provider, through which telephone and/or data communication services are provided among a plurality of users and a telephone service providing station (not shown). DC currents flowing through the PSTN 100 are transmitted to the main terminal device 200.

The main terminal device 200 according to an embodiment of the present invention includes a PSTN connection unit 210, a first switching unit 220, a first external terminal connection unit 230, a feeding circuit 240, and an external terminal detection unit 250. The PSTN connection unit 210 has at least four pins including a first pin 212, a second pin 214, a third pin 216, and a fourth pin 218. In FIG. 3, the PSTN connection unit 210 is illustrated to include only the first through fourth pins 212 through 218. However, there is no limit to the number of pins included in the PSTN connection unit 210. That is, it is understood that the PSTN connection unit 210 may include more than these four pins.

The PSTN connection unit 210 connects the main terminal device 200 with the PSTN 100 through the first and the second pins 212 and 214. Further, the PSTN connection unit 210 connects one of external terminal devices (i.e., the first external terminal device 300) with the first and the second pins 212 and 214 through the third and the fourth pins 216 and 218. Here, the fourth pin 218 is connected with the first switching unit 220.

Figure 2:
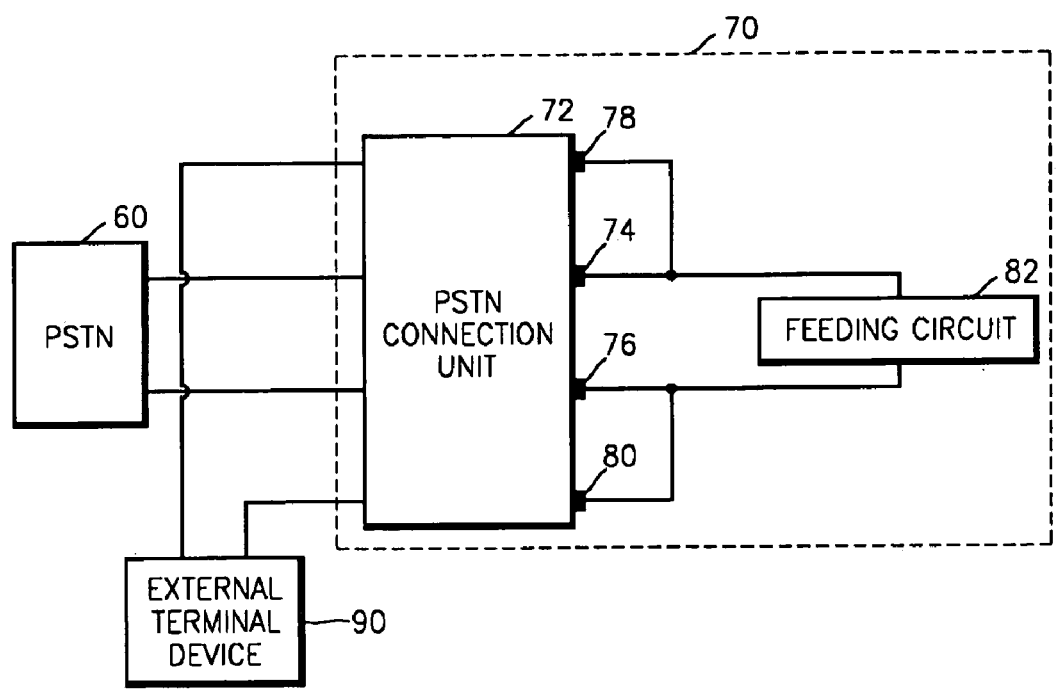
FIG. 2 is a block diagram of a serial type telecommunication terminal device typically used in Germany or Italy that is connected to an external terminal device.

The first switching unit 220 selectively connects the first external terminal device 300 or the other external terminal device (i.e., the second external terminal device 400) with the PSTN 100. For this, one end of the first switching unit 220 is connected with a transmission line connecting the feeding circuit 240 and the second pin 214 of the PSTN connection unit 210. The other end of the first switching unit 220 is switched between the fourth pin 218 of the PSTN connection unit 210 and a sixth pin 234 of the external terminal connection unit 230 to be selectively connected with the fourth pin 214 or the sixth pin 234. A user may manually operate the first switching unit 220. That is, if a parallel type interface as shown in FIG. 1 is required, the user switches the first switching unit 220 to connect the second external terminal device 400 with the PSTN 100. On the other hand, if a serial type interface as shown in FIG. 2 is required, the user switches the first switching unit 220 to connect the first external terminal device 300 with the PSTN 100. However, it is understood that this operation can be performed automatically according to a determined type of accessing external terminal device.

The first external terminal connection unit 230 has at least a fifth pin 232 and the above-mentioned sixth pin 234. In FIG. 3, the first external terminal connection unit 230 is illustrated to include only the fifth and sixth pins 232 and 242 but there is no limit to the number of pins included therein. That is, it is understood that the first external terminal connection unit 230 may include more than the fifth and sixth pins 232 and 242.

The first external terminal connection unit 230 connects the second external terminal device 400 with the first and the second pin 212 and 214 through the fifth and the sixth pins 232 and 234. Here, the sixth pin 234 is connected with the first switching unit 220.

The feeding circuit 240 is for maintaining the flow of DC currents transmitted from a telephone exchanger (not shown) in order to sustain an active telecommunication mode of the main terminal device 200. The telephone exchanger determines whether the main terminal device 200 is in an active mode by detecting the DC currents flowing into the main terminal device 200. That is, if the currents continuously flow into the main terminal device 200, the telephone exchanger determines that a telecommunication line to the main terminal device 200 is active. Therefore, the feeding circuit 240 sustains the active mode of the main terminal device 200 by maintaining the currents flowing in the main terminal device 200.

The external terminal detection unit 250 detects whether telecommunication signals are exchanged between the second external terminal device 400 and the PSTN 100. It is preferable, but not required, that the external terminal detection unit 250 is placed between the first switching unit 220 and the transmission line connecting the feeding circuit 240 and the second pin 214. A user may conclude that the second external terminal device 400 is currently exchanging telecommunication signals using the signals detected by the external terminal detection unit 250. Alternately, a controller (not shown) may detect and determine that the second external terminal device 400 is currently exchanging telecommunication signals according to the external terminal detection unit 250.

Figure 4:
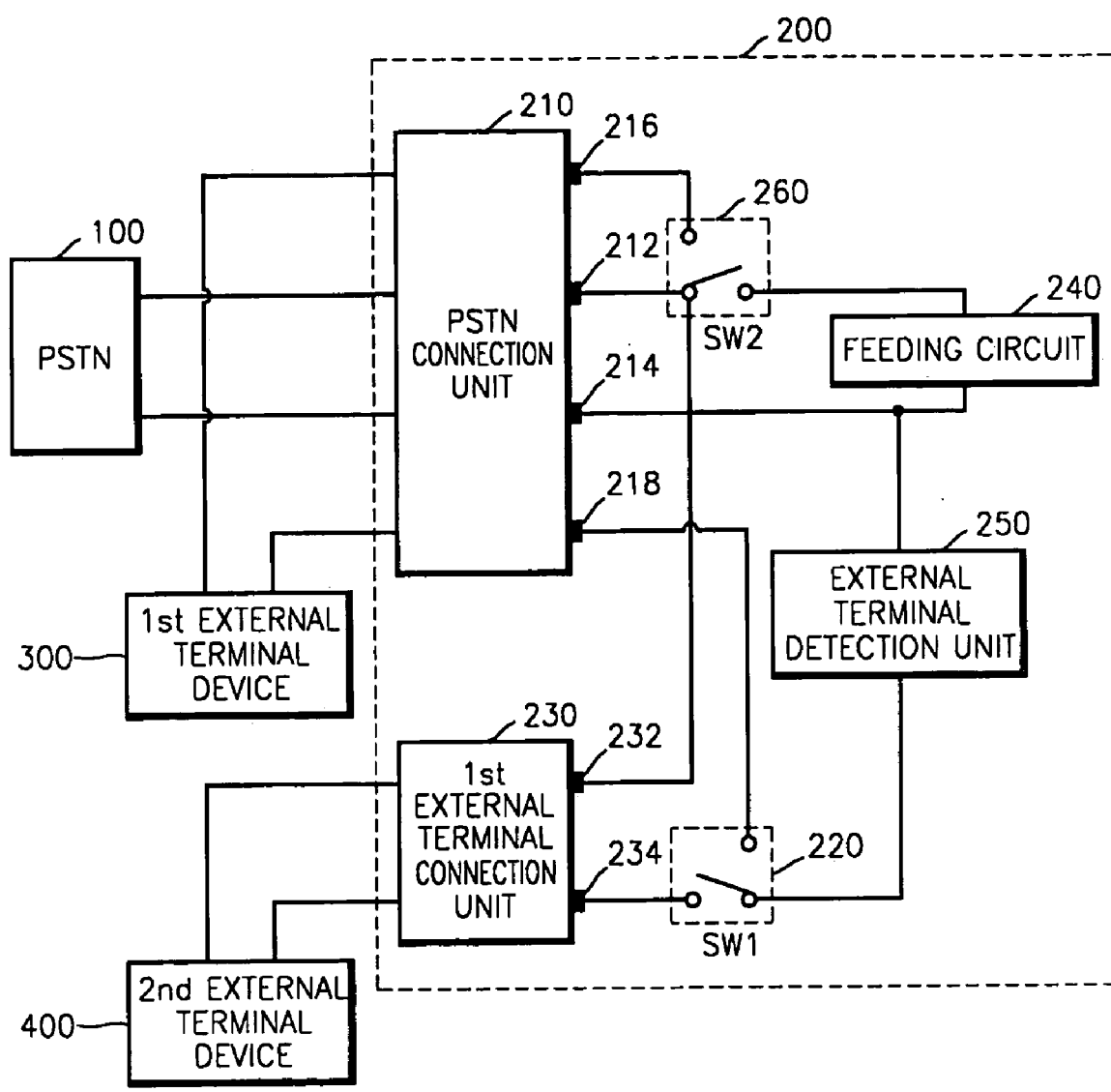
FIG. 4 is a block diagram of a telecommunication terminal device according to an embodiment of the present invention to which a second external terminal device is connected through a second switching unit.

According to another embodiment of the present invention, in addition to the elements shown in FIG. 3, a second switching unit can be included in the main terminal device 200. FIG. 4 is a block diagram of a telecommunication terminal device according to an embodiment of the present invention, to which a second external terminal device 400 is connected through a second switching unit 260. Detailed descriptions on the elements identical to those shown in FIG. 3 are omitted herein below.

Referring to FIG. 4, the second switching unit 260 selectively connects the first pin 212 of the PSTN connection unit 210 with the third pin 216 thereof or the feeding circuit 240. When the second switching unit 260 connects the first pin 212 of the PSTN connection unit 210 with the third pin 216, the currents provided from the PSTN 100 are applied to the first external terminal device 300 through the first and the third pins 212 and 216. At this instant, since the feeding circuit 240 of the main terminal device 200 and the first pin 212 of the PSTN connection unit 220 are open (i.e., disconnected by the second switching unit 260) the currents are not flowing through the feeding circuit 240. Therefore, the second switching unit 260 does not allow the first external terminal device 300 to transmit or receive telecommunication signals.

According to still another embodiment of the present invention, in addition to the elements shown in FIG. 3, a kth external terminal connection unit can be included in the main terminal device 200, where k is a positive integer greater than 1. The kth external terminal connection unit has at least an $i^{th}$ pin and an $(i+1)^{th}$ pin, and connects a $j_{th}$ external terminal device with the fifth and the sixth pins 232 and 234 through the $i^{th}$ and the $(i+1)^{th}$ pins, where i is a positive integer greater than 6, and j is a positive integer greater than 2.

Figure 5:
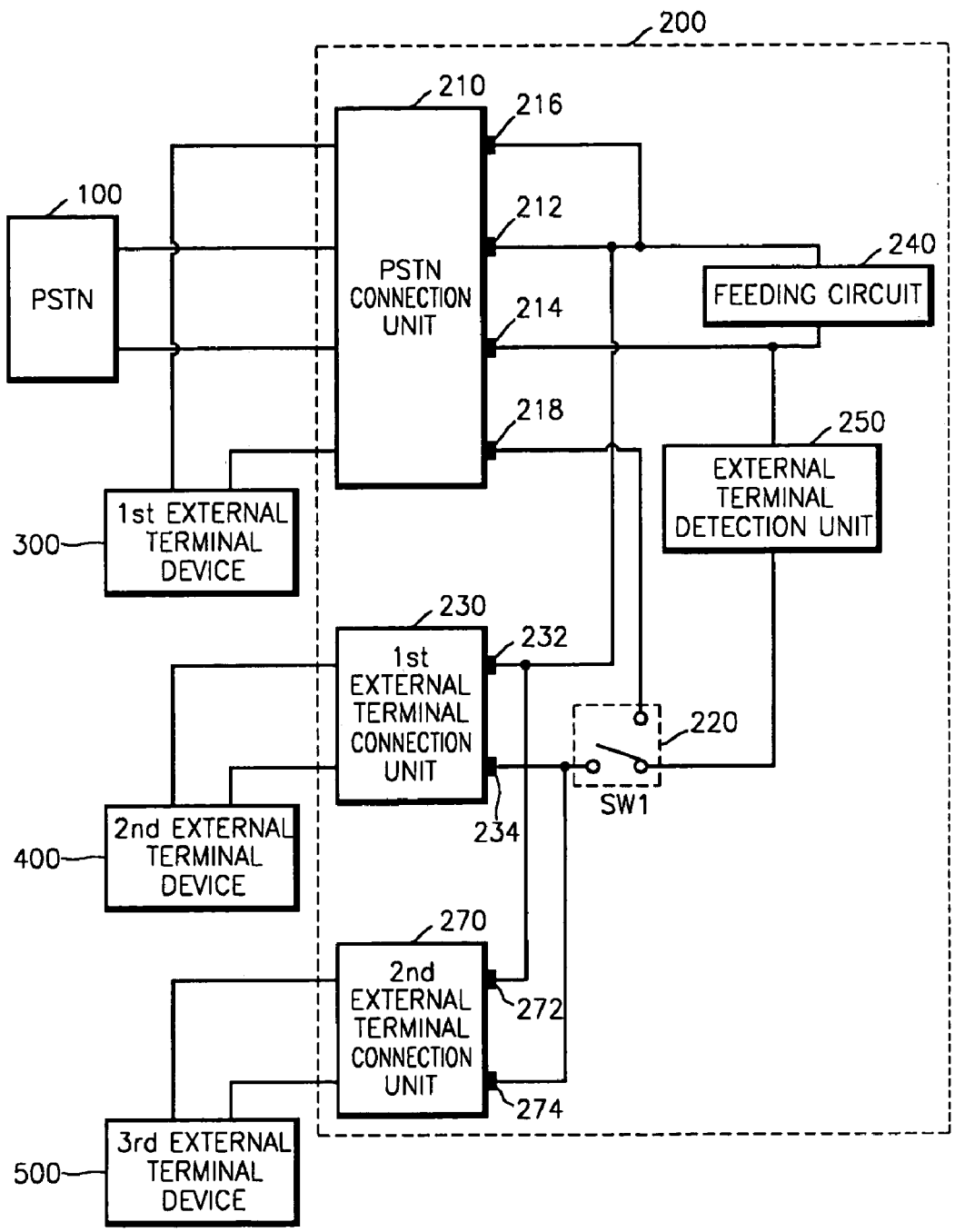
FIG. 5 is a block diagram of a telecommunication terminal device according to an embodiment of the present invention to which a third external terminal device is connected through a second external terminal connection unit.

FIG. 5 is a block diagram of a telecommunication terminal device according to an embodiment of the present invention, to which a third external terminal device 500 is connected through a second external terminal connection unit 270. Detailed descriptions on the elements identical to those shown in FIG. 3 are omitted herein below.

Referring to FIG. 5, the second external terminal connection unit 270 has at least a seventh pin 272 and an eighth pin 274, and connects the third external terminal device 500 with the fifth and the sixth pins 232 and 234 through the seventh and the eighth pins 272 and 274. The second external terminal connection unit 270 receives the currents applied from the PSTN 100 to the fifth and the sixth pins 232 and 234 of the first external terminal connection unit 230, and provides the currents to the third external terminal device 500. Also, a third external terminal connection unit (not shown) includes at least two pins that are connected to the seventh and the eighth pins 272 and 274, respectively. Therefore, the third external terminal connection unit is provided with currents applied from the seventh and the eighth pins 272 and 274 of the second external terminal connection unit 270 and supplies the provided currents to a fourth external terminal device (not shown).

Figure 6:
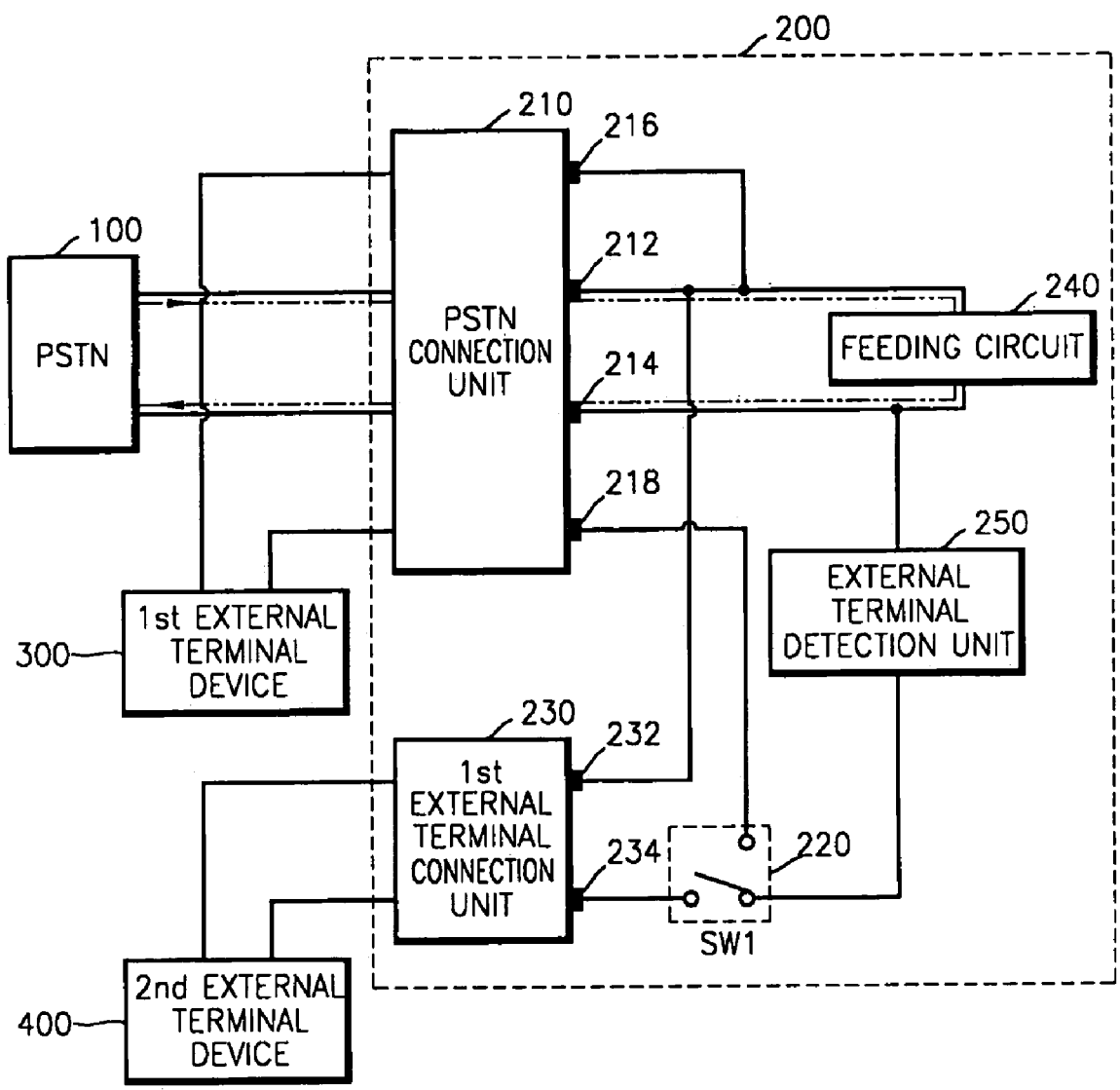
FIG. 6 shows currents applied to the telecommunication terminal device shown in FIG. 3.

Now, operations of a telecommunication terminal device according to an embodiment of the present invention will be described with reference to FIGS. 6 to 8. FIG. 6 shows currents applied to the telecommunication terminal device shown in FIG. 3 (i.e., the main terminal device 200) when no external terminal devices 300, 400 are connected thereto. The currents applied from the PSTN 100 to the PSTN connection unit 210 are input to the feeding circuit 240 through the first pin 212 of the PSTN connection unit 210. The currents input to the feeding circuit 240 are output to the PSTN 100 through the second pin 214 of the PSTN connection unit 210.

Figure 7:
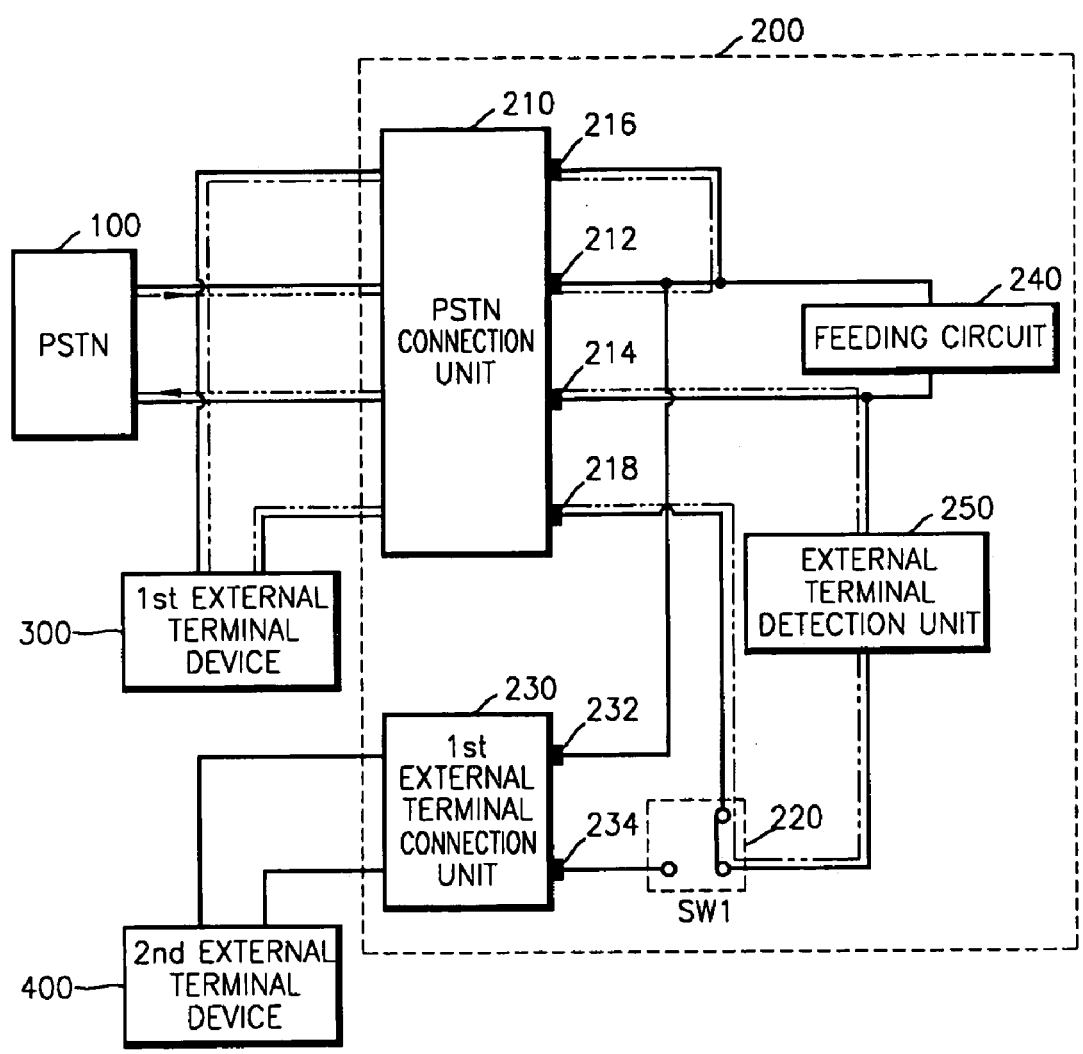
FIG. 7 shows currents applied to the telecommunication terminal device shown in FIG. 3 when the first switching unit thereof connects a first external terminal device with a public telephone network.

FIG. 7 shows currents applied to the telecommunication terminal device shown in FIG. 3 (i.e., the main terminal device 200) when the first switching unit 220 connects the first external terminal device 230 with the PSTN 100. The currents applied from the PSTN 100 to the PSTN connection unit 210 are input to the feeding circuit 240 through the first pin 212 of the PSTN connection unit 210 as described above. In addition, the currents are input to the first external terminal device 300 through the first and the third pins 212 and 216 of the PSTN connection unit 210. The currents input to the first external terminal device 300 are applied to the first switching unit 220 through the fourth pin 218 of the PSTN connection unit 210. The currents applied to the first switching unit 220 are output to the PSTN 100 through the external terminal detection unit 250 and then through the second pin 214 of the PSTN connection unit 210. At this instant, since the second external terminal device 400 is disconnected with the PSTN 100 by the first switching unit 220, no currents are provided to the second external terminal device 400. Therefore, the second external terminal device 400 is in a disable mode, and no telecommunication signals can be exchanged through the second external terminal device 400.

Figure 8:
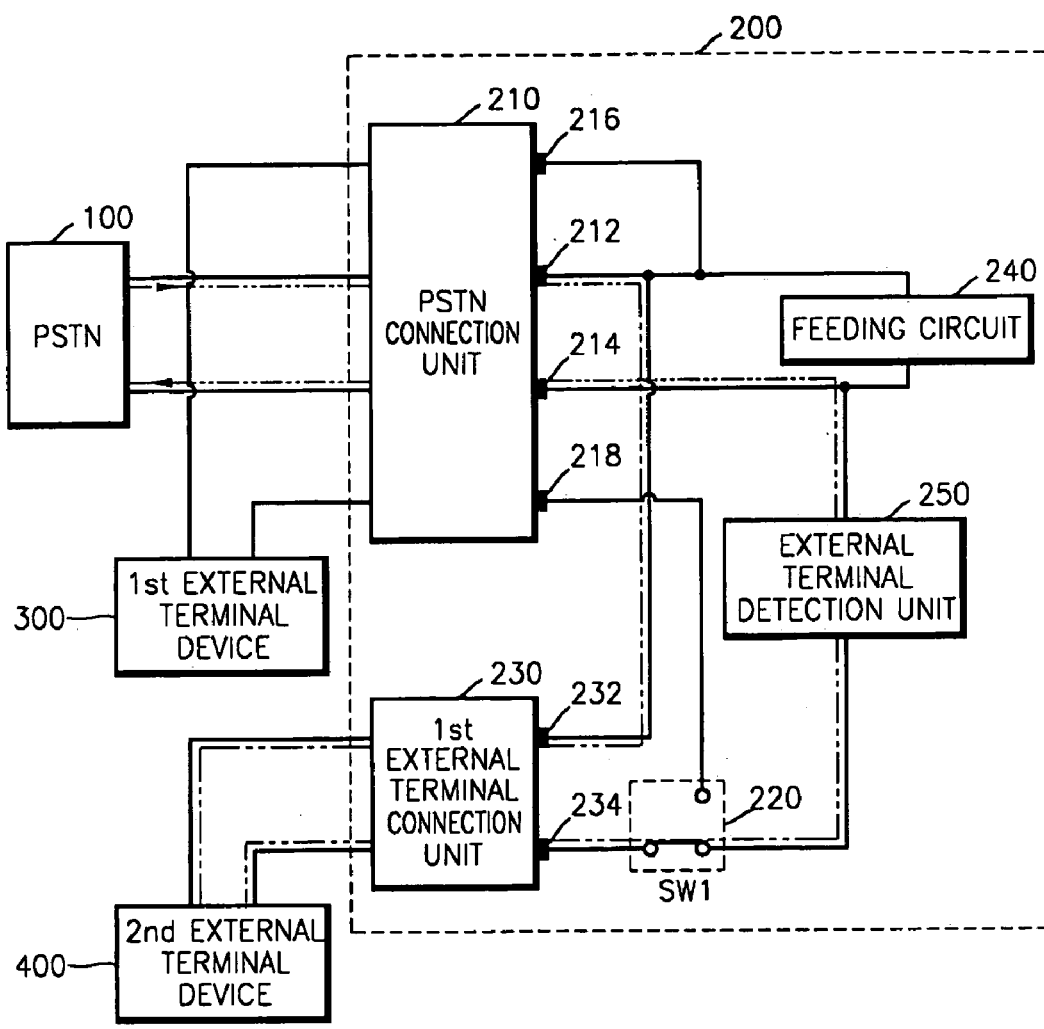
FIG. 8 shows currents applied to the telecommunication terminal device shown in FIG. 3 when the first switching unit thereof connects a second external terminal device with a public telephone network.

FIG. 8 shows currents applied to the telecommunication terminal device shown in FIG. 3 (i.e., the main terminal device 200) when the first switching unit 220 connects the second external terminal device 400 with the PSTN 100. The currents applied from the PSTN 100 to the PSTN connection unit 210 are input to the feeding circuit 240 through the first pin 212 of the PSTN connection unit 210 as described above. In addition, the currents are applied to the fifth pin 232 of the first external terminal connection unit 230 through the first pin 212 of the PSTN connection unit 210. The currents applied to the fifth pin 232 are input to the second external terminal device 400. The currents inputted to the second external terminal device 400 are applied to the first switching unit 220 through the sixth pin 234 of the first external terminal connection unit 230. The currents applied to the first switching unit 220 are output to the PSTN 100 through the external terminal detection unit 250 and then through the second pin 214 of the PSTN connection unit 210. At this instant, since the first external terminal device 300 is disconnected with the PSTN 100 by the first switching unit 220, no currents are provided to the first external terminal device 300. Therefore, the first external terminal device 300 is in a disable mode, and no telecommunication signals can be exchanged through the first external terminal device 400.

Figure 9:
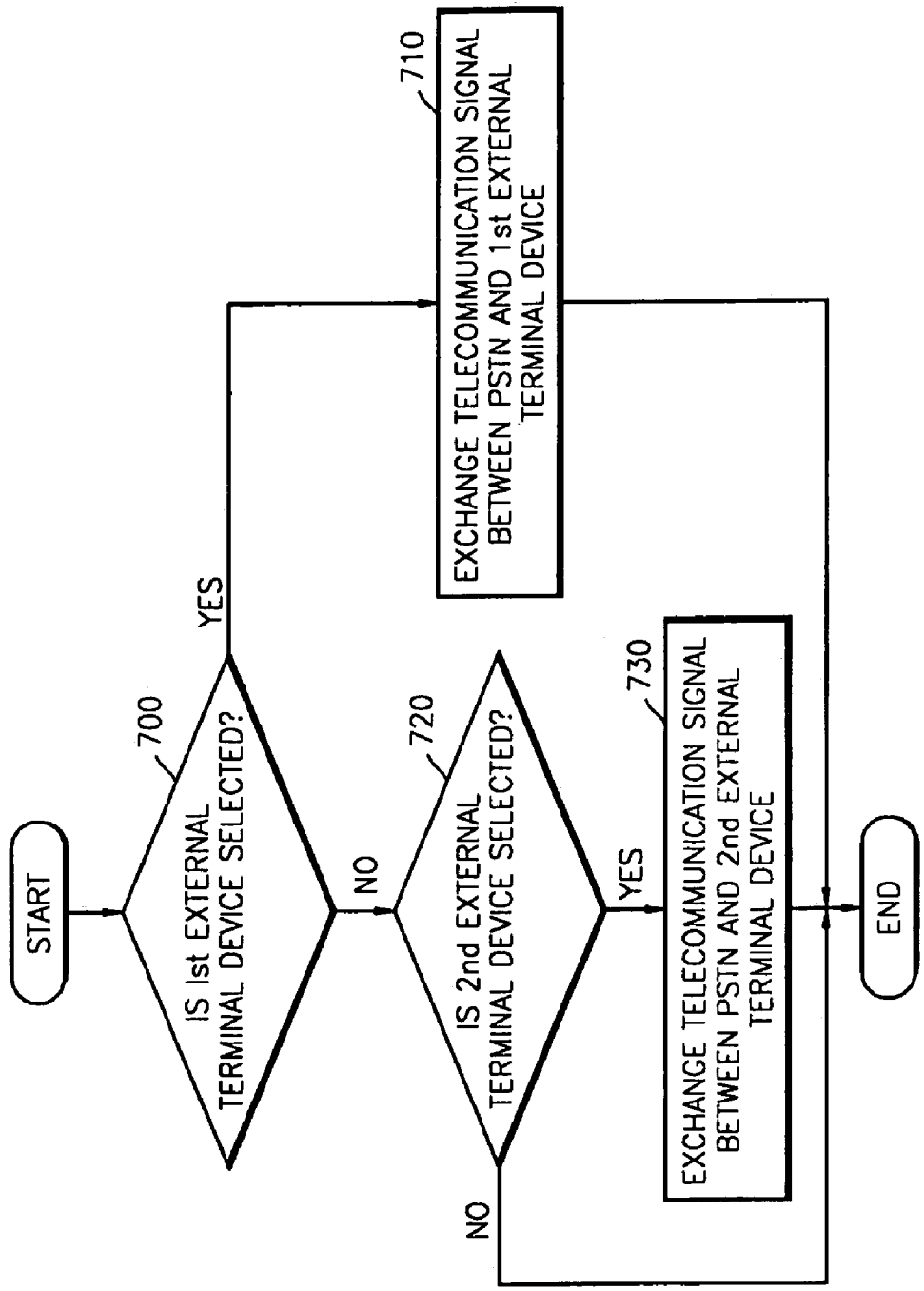
FIG. 9 is a flowchart of a method of using a telecommunication terminal device according to an embodiment of the present invention.

A method of using a telecommunication terminal device according to the present invention will be described with reference to FIG. 9. FIG. 9 is a flowchart of a method of using a telecommunication terminal device shown in FIG. 1 (i.e., the main terminal device 200) according to an embodiment of the present invention.

It is determined whether the first external terminal device 300 is selected (operation 700). If it is determined that the first external terminal device 300 is selected, telecommunication signals are exchanged between the PSTN 100 and the first external terminal device 300 (operation 710). Circuit connection and current flow for exchanging telecommunication signals in operation 710 are shown in FIG. 7. That is, as the first switching unit 200 is switched to connect the fourth pin 218 of the PSTN connection unit 210, the PSTN 100 and the first external terminal device 300 are allowed to exchange telecommunication signals.

However, if it is determined that the first external terminal device 300 is not selected in operation 700, it is determined whether the second external terminal device 400 is selected (operation 720). If it is determined that the second external terminal device 400 is selected, telecommunication signals are exchanged between the PSTN 100 and the second external terminal device 400 (operation 730). Circuit connection and current flow for exchanging telecommunication signals in operation 730 are shown in FIG. 8. That is, as the first switching unit 200 is switched to connect the sixth pin 234 of the first external terminal connection unit 230, the PSTN 100 and the second external terminal device 400 are allowed to exchange telecommunication signals.

It is understood that the method shown in FIG. 9 could be implemented using a controller and/or a controller utilizing a computer program to implement the method of FIG. 9. Such a computer program can be implemented as firmware.

As described above, a telecommunication terminal device according to the present invention is capable of exchanging telecommunication signals regardless of serial or parallel connection of additional external terminal devices.

While the present invention has been particularly shown and described with reference to embodiments thereof, it will be understood by those of ordinary skill in the art that various changes in form and details may be made therein without departing from the spirit and scope of the present invention as defined by the accompanying claims and equivalents thereof.

What is claimed is:

1. A telecommunication terminal device for use with a public telephone network to transmit and receive telecommunication signals and is capable of connecting external terminal devices of different connection types with the public telephone network, the telecommunications terminal device comprising:
a network connection unit having at least a first pin and a second pin to which the public telephone network is connected, and a third pin and a fourth pin through which a first external terminal device of a first connection type interface is connected to the first and the second pins according to a first switching unit;
the first switching unit to selectively connect the first external terminal device and a second external terminal device of a second connection type interface other than the first connection type interface with the public telephone network;
a first external terminal connection unit having at least a fifth pin and a sixth pin through which the second external terminal device is connected to the first and the second pins according to the first switching unit; and
a feeding circuit connected to the first and the second pins to keep a current provided from the public telephone network flowing;
wherein the first switching unit selectively establishes a parallel connection between the public telephone network and one of the first and second external terminal devices, and selectively establishes a serial connection between the public telephone network and the other one of the first and second external terminal devices.

2. The telecommunication terminal device according to claim 1, further comprising a second switching unit to selectively connect the first pin of the network connection unit to the third pin and to the feeding circuit.

3. The telecommunication terminal device according to claim 2, further comprising a transmission line which connects the feeding circuit and the second pin, wherein the first switching unit selectively connects the fourth pin and the sixth pin with the transmission line.

4. The telecommunication terminal device according to claim 3, further comprising an external terminal detection unit connected between the first switching unit and the transmission line and which detects whether telecommunication signals are transmitted and received between the second external terminal device and the public telephone network.

5. The telecommunication terminal device according to claim 1, further comprising a transmission line which connects the feeding circuit and the second pin, wherein the first switching unit selectively connects the fourth pin and the sixth pin with the transmission line.

6. The telecommunication terminal device according to claim 5, further comprising an external terminal detection unit connected between the first switching unit and the transmission line and which detects whether telecommunication signals are transmitted and received between the second external terminal device and the public telephone network.

7. The telecommunication terminal device according to claim 1, further comprising a $k^{th}$ external terminal connection unit having at least an $i^{th}$ pin and an $(i+1)^{th}$ pin through which a $J^{th}$ external terminal device is connected with the fifth and the sixth pins, wherein i is a positive integer greater than 6, j is a positive integer greater than 2, and k is a positive integer greater than 1.

8. A method of using a telecommunication terminal device comprising:
determining whether a first external terminal device of a first connection type interface is selected;
if there is a determination that the first external terminal device is selected, allowing telecommunications between a public telephone network and the first external terminal device:
if there is a determination that the first external terminal device is not selected, determining whether a second external terminal device of the second connection type interface is selected:
and
if there is a determination that the second external terminal device is selected and that the first external terminal device is not selected, allowing telecommunications between the public telephone network and the second external terminal device; and
comprising opening a connection between the public telephone network and one of the first external terminal device and the second external terminal device so as to disconnect an established connection between the public telephone network and the one of the first external terminal device and the second external terminal device regardless of the first and second states of the switching unit;

wherein,
the allowing telecommunications between the public telephone network and the second external terminal device comprises establishing one of a serial connection and a parallel connection between the second external terminal device and the public telephone network;
the establishing the one of the serial and the parallel connections between the second external terminal device and the public telephone network comprises switching a switching unit of a terminal to which the second external terminal device is connected to a first state, and
the establishing the other one of the serial and the parallel connections between the first external terminal device and the public telephone network comprises switching the switching unit of the terminal to which the first external terminal device is connected to a second state other than the first state.

9. A telecommunication terminal device for use with a public telephone network and external terminal devices of different types, the telecommunications terminal device comprising:
   a network connection unit through which a connection to the public telephone network is maintained;
   a first external terminal connection unit which serially connects a first external terminal device having a serial-type interface to the public telephone network using the network connection unit according to a first switching unit being in a first state;
   a second external terminal connection unit which connects a second external terminal device having a parallel-type interface in parallel to the public telephone network using the network connection unit according to the first switching unit being in a second state; and
   the first switching unit electrically connected between the network connection unit and the first and second external connection units such that, according to the first and second states, the first external terminal device and the second external terminal device are connected with the public telephone network, wherein the network connection unit includes first and second pins,
the first external terminal connection unit comprises third and fourth pins, and
the first switching unit is disposed in a connection between one of the first and second pins and one of the third and fourth pins so that, when in the first state, the serial connection is formed, and when in the second state, the serial connection is not formed.

10. The telecommunication terminal device of claim 9, wherein:
   the second external terminal connection unit comprises fifth and sixth pins, and
   the first switching unit is disposed in an electrical pathway between one the first and second pins and one of the fifth and sixth pins so that, when in the second state, the parallel connection is formed, and when in the first state, the parallel connection is not formed.

11. The telecommunication terminal device of claim 9, further comprising a second switching unit disposed in an electrical pathway between one of the first and second external terminal devices and the network connection unit so that, when in a first state, the electrical pathway is disconnected, and when in a second state, the electrical pathway is connected.

12. The telecommunication terminal device of claim 9, further comprising a second switching unit disposed in an electrical pathway between one the first and second pins and one of the third and fourth pins so that, when in the first state, the serial connection is opened and when in a second state, the serial connection is closed.

13. The telecommunication terminal device of claim 9, further comprising a detection unit which detects which one of the first and second external terminal devices is transmitting signals across the public telephone network.

* * * * *

UNITED STATES PATENT AND TRADEMARK OFFICE
CERTIFICATE OF CORRECTION

PATENT NO. : 7,209,552 B2
APPLICATION NO. : 10/685471
DATED : April 24, 2007
INVENTOR(S) : Eog-kyu Kim It is certified that error appears in the above-identified patent and that said Letters Patent is hereby corrected as shown below:

Column 8, Line 38, change "$J^{th}$" to --$j^{th}$--.

Column 8, Line 49, change "device:" to --device;--.

Column 8, Line 53, change "selected:" to --selected;--.

Signed and Sealed this

Seventh Day of August, 2007

JON W. DUDAS
*Director of the United States Patent and Trademark Office*